United States Patent [19]

Moore

[11] 3,958,503
[45] May 25, 1976

[54] SPAGHETTI COOKING SYSTEM

[75] Inventor: L. Frank Moore, Shreveport, La.

[73] Assignee: The Frymaster Corporation, Shreveport, La.

[22] Filed: May 3, 1974

[21] Appl. No.: 466,530

[52] U.S. Cl.................................. 99/327; 99/336; 99/356; 99/407; 99/416; 99/448; 99/450; 206/519; 426/509
[51] Int. Cl.².......................................... A47J 27/62
[58] Field of Search ........... 426/506, 451, 509, 496, 426/158; 99/336, 327, 352, 355, 356, 407, 410, 416, 417, 448, 450; 206/519, 520

[56] References Cited
UNITED STATES PATENTS

| | | | |
|---|---|---|---|
| 2,650,536 | 9/1953 | Russell | 99/416 |
| 2,667,422 | 1/1954 | Kauffman | 206/519 X |
| 2,738,914 | 3/1956 | Hatch | 206/519 X |
| 2,852,157 | 9/1958 | Frater | 206/519 X |
| 2,875,682 | 3/1959 | Smoot et al. | 99/336 |
| 3,071,064 | 1/1963 | Horvath | 99/336 |
| 3,424,076 | 1/1969 | Bernatz et al. | 99/416 |
| 3,455,232 | 7/1969 | Oliver | 99/448 X |
| 3,608,473 | 9/1971 | Kearn et al. | 99/336 |

Primary Examiner—Billy J. Wilhite
Attorney, Agent, or Firm—Hubbard, Thurman, Turner & Tucker

[57] ABSTRACT

A system for cooking spaghetti and similar pasta products includes a cooking section and a storage section with means for supplying water alternately to either section. The cooking section is equipped with a cook pot having conventional electric or gas heaters for heating water to cook spaghetti. A cooking basket containing spaghetti is suspended in the cook pot by attachment to a basket lifter. Electrical timing means connected to the basket lifter automatically lower the cooking basket at the start of a preselected cook cycle and raise the basket out of the cook pot after the cooking period has ended. The storage section includes a storage tank for rinsing and storing cooked spaghetti in cold water. Multiple rows of nesting cups stacked vertically store individual serving portions of spaghetti in the storage tank. A cup rack is used to reconstitute the spaghetti by suspending the serving cups containing cooked spaghetti in the hot water of the cook pot. The spaghetti is automatically cooked in boiling water in the cook pot and then rinsed and placed in the serving cups in individual portions for storing in cold water in the storage tank. Before serving, the spaghetti is reconstituted by placing the serving cups containing spaghetti in the cup rack on the basket lifter. The cups are lowered into the cook pot, and the spaghetti is briefly heated by hot water which is thermostatically maintained below boiling. The cup racks are then automatically raised out of the water and the heated spaghetti portions are served.

19 Claims, 16 Drawing Figures

SPAGHETTI COOKING SYSTEM

BACKGROUND AND SUMMARY OF THE INVENTION

This invention relates to a cooking system and more particularly to apparatus and a process for cooking, storing and reconstituting spaghetti.

Modern convenience restaurants usually feature rapid service for prepared foods, such as fried hamburgers, chicken, fish and potatoes. Often these fast foods are prepared some time in advance and then placed in warming ovens until sold. Since most foods do not keep well in warming ovens, the menus offered by convenience restaurants have been rather limited. Even the fast foods normally used must be disposed of if not sold within a short period after preparation. Substantial price increases in meats and other products used by convenience restaurants have increased costs to customers and decreased the profit margin for restaurant owners.

Spaghetti and other pasta products have grown in popularity with customers and proprietors of convenience restaurants. Costs are considerably less per serving to buy and prepare spaghetti than for most other fast foods. However, the difficulties and the time delays in rapidly preparing spaghetti has made its use as a fast food impractical for most quick service eating places.

The present invention comprises a simplified and automated system for the preparation of spaghetti and other similar pasta products. As used herein the term "spaghetti" is meant to include other similar pasta products which are suitable for cooking in the system of the present invention. The present system provides for simple and efficient preparation of spaghetti as a convenience food, utilizing cooking and storing apparatus in a relatively compact area. The spaghetti is automatically cooked and then stored to be quickly reconstituted as required.

In accordance with a broad aspect of the invention, a cooking basin is provided with a quantity of water and heater units in the cooking basin. A container is suspended in the cooking basin for cooking spaghetti in the hot water of the basin for a predetermined time period. Control means are provided for automatically lowering the cooking container into the hot water at the beginning of the predetermined time period and for automatically lifting the container out of the hot water after the predetermined period has ended. A storage basin adjacent the cooking basin contains cool water for storing the cooked spaghetti. A group of reconstituting containers is attachable to the control means for automatically heating portions of the stored spaghetti in the cooking basin for a second predetermined period to quickly reconstitute the spaghetti for serving.

In accordance with another aspect of the present invention, a cook pot and a storage tank are provided in the open top of a free-standing housing. Electric or gas heaters are disposed in or near the cook pot and a swivel water faucet is attached to the housing for alternately supplying water to the cook pot and the storage tank. A cooking basket containing spaghetti is suspended in the hot water of the cook pot by attachment to a vertical basket lifter. The lifter is vertically reciprocated, using an electrical motor according to a selected cooking cycle by control circuitry within the housing. Nestable serving cups are placed in cool water in the storage tank for compactly containing the cooked spaghetti in individual servings. Cup racks each of which hold a number of cups are provided for attaching to the basket lifter to support the serving cups in the hot water of the cook pot.

For cooking, spaghetti is placed in the cooking basket attached to the basket lifter and automatically immersed in the hot water of the cook pot. When the cooking cycle is finished, the basket is automatically raised out of the hot water and is moved to the storage tank. The cooked spaghetti is rinsed with cold water and placed in individual servings in the nestable serving cups. The cups are then stacked in vertical columns in cool water in the storage tank. To reconstitute the spaghetti, the serving cups are placed in a cup rack which is attached to the basket lifter and automatically lowered into the hot water of the cook pot. After a short reheating cycle, the cup rack is automatically raised out of the hot water and the spaghetti is removed from the cups for serving.

The present invention provides a simple and efficient system and process for preparing spaghetti as a quick-service food. The timing apparatus automatically controls the cooking process to free the operator for other activities. The adjoining storage basin and nestable serving cups enable very compact storage of a large number of individually proportioned servings for an indefinite period, allowing the further preparation of spaghetti in the cooking section. The stored spaghetti may be quickly reconstituted, using the cook pot and the automatic timing system in order to provide fast service to waiting customers.

BRIEF DESCRIPTION OF THE DRAWINGS

For a more complete understanding of the invention and for further objects and advantages thereof, reference is made to the following detailed description of the preferred embodiments taken in conjunction with the accompanying drawings, wherein.

DETAILED DESCRIPTION OF THE PREFERRED EMBODIMENT

Figure 1:
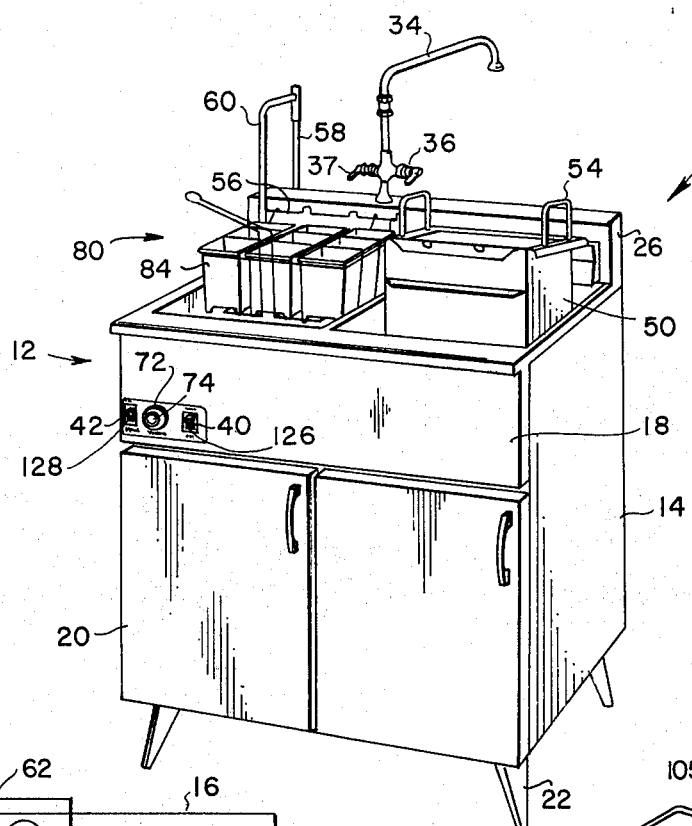
FIG. 1 is a perspective view of a cooking system incorporating the present invention.
Figure 2:
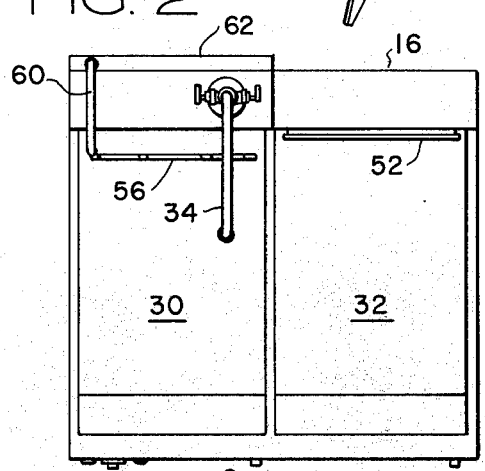
FIG. 2 is a top plan view of the cooking system of FIG. 1.

Referring now to FIGS. 1–4, a cooking system 10 is shown incorporating the present invention. The cooking system 10 includes a housing 12, having side panels 14, a back panel 16 and a front panel 18 in the upper portion of housing 12. Two hinged cabinet doors 20 enclose the lower front portion of housing 12. The housing stands on four legs 22 extending downward from a bottom panel 24. A vertically extending panel enclosure 26 projects upward along the back of housing 12.

An open-top cook pot 30 is integral with the housing in the upper left side of housing 12. A storage tank 32, also open at the top, is disposed adjacent to cook pot 30 in the upper right hand side of housing 12. Both cook pot 30 and storage tank 32 are preferably made of stainless steel. A swivel water faucet 34 is mounted on the panel enclosure 26 at the rear of cook pot 30 and extends over the top of housing 12. Faucet 34 is horizontally rotatable at its base so as to direct a stream of water into either cook pot 30 or storage tank 32. Handles 36 and 37 are provided near the base of faucet 34 to control the output of hot and cold water, respectively.

Figure 4:
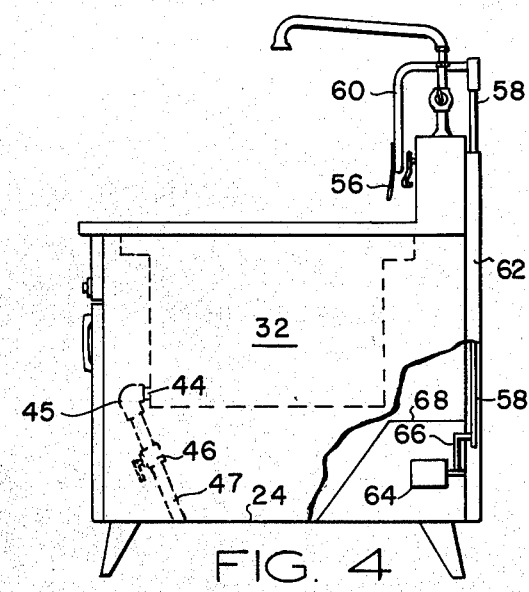
FIG. 4 is a side elevation view of the cooking system of FIG. 1.

A heater switch 40 is mounted on the left hand side of front panel 18. Switch 40 is used to turn on heaters 41 disposed near the bottom of cook pot 30. Heaters 41 are preferably electric or gas and may be of the dual controlled, full on or thermostatically regulated type. A boil/simmer switch 42 is also mounted on front panel 18 near switch 40 for switching the heaters 41 between a thermostatically regulated simmer mode maintaining the water below boiling and a boil mode raising the temperature of the water to the boiling point. Drain outlets 44, as shown in FIG. 4, are provided at the front bottom of both cook pot 30 and storage tank 32 to provide a means for rapidly draining the two basins. Each drain outlet 44 is connected to an elbow pipe 45 which leads to a drain valve 46. A drain tube 47 projects from drain valve 46 through bottom panel 24 to output used water to a floor drain.

A cooking basket 50 is shown in FIG. 1 attached to a rigid suspension plate 52 extending across the top rear of storage tank 32. U-shaped handles 54 are attached at two sides of basket 50 at the top of the basket to facilitate moving basket 50 from the cook pot 30 to storage tank 32. A lifter plate 56 extends transversely across the back top portion of cook pot 30 and is mounted to reciprocate vertically along the back wall of cook pot 30. Plate 56 is connected to a vertical lift arm 58 by an L-shaped rod connecter 60 which projects over the top of panel enclosure 26. Lift arm 58 extends down the back of housing 12 inside a vertical panel extension enclosure 62 attached behind a portion of back panel 16. The bottom end of lift arm 58 connects to a gear motor 64 by a bell crank arm 66. The motor 64 is attached to rear panel 16 and is enclosed within a secondary enclosure 68 and the rear bottom of housing 12.

Motor 64 is activated by a button 74 mounted on front panel 18 between heater switch 40 and boil switch 42. A selector dial 72, encompassing activator button 74, is used in selecting the time period for the cooking cycle. Selector dial 72 is connected to activate a timer motor 134 and activator button 74 is connected to a switch 75, both being part of the timing circuitry shown in FIG. 8 and described later.

Figure 5:
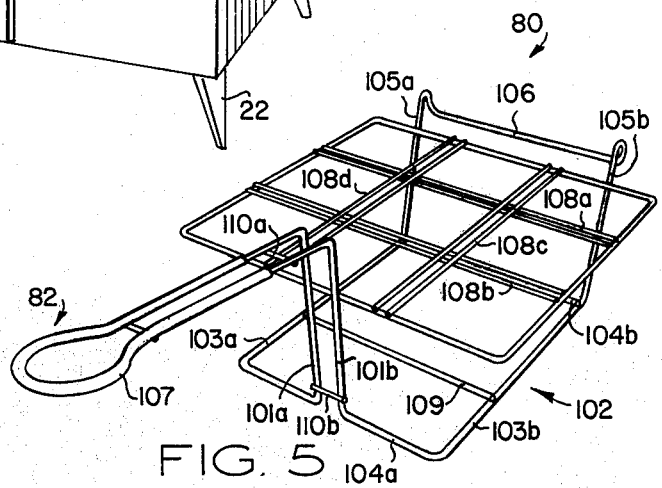
FIG. 5 is a perspective view of the cup rack of the present invention.
Figure 3:
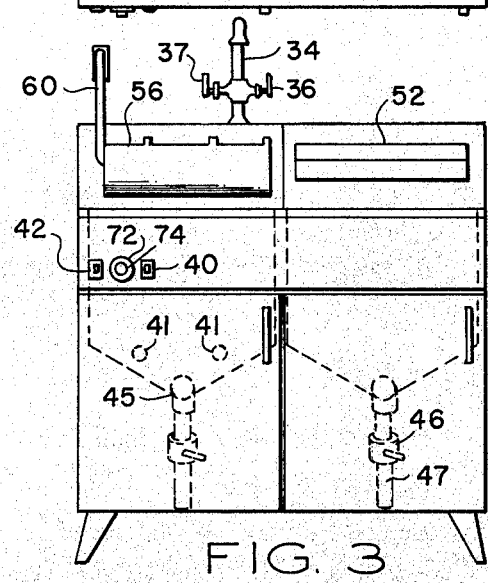
FIG. 3 is a front elevation view of the cooking system of FIG. 1.
Figure 6:
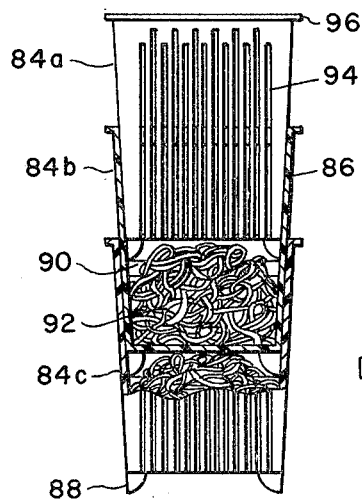
FIG. 6 is a partially cut-away side view of the nested serving cups of the present invention.

As shown in FIG. 1, a cup rack 80 is connected at one end to lifter plate 56 so as to be suspended over cook pot 30. Up to nine rectangular serving cups 84 are contained within the cup rack 80 in a horizontal array three wide by three deep. As best seen in FIG. 5, the cup rack 80 is made of strong rod-like material, preferably of stainless steel, forming a lower rectangle 102 having two sides 103a and 103b, a front bar 104a and a rear bar 104b. The sides 103a-b extend upward as two parallel rods 105a and 105b which are curved at the upper ends to form a hook crossbar 106 to connect over lifter plate 56. The front bar 104a extends as parallel rods 101a and 101b upward and then outward away from cup rack 80 to join in a circular shape forming a handle 82. A heat insulating material 107, covers handle 82 to prevent injury. An upper rectangular matrix 108, also preferably of stainless steel rods, is positioned above and parallel to rectangle 102 connected between rods 105a-b and rods 101a-b. Matrix 108 is dimensioned by dividing bar pairs 108a – 108d to contain up to nine serving cups 84 by supporting a flanged lip 96 around the rim of each cup as shown in FIG. 6. A support rod 109 extends transversely between sides 103a and 103b of lower rectangle 102. Small support rods 110a and 110b also extend between parallel rods 101a-b to provide rigidity to the cup rack 80.

Three vertically stacked cups 84a, 84b and 84c are shown in FIG. 6 to illustrate the nesting characteristic of cups 84. Each rectangular serving cup 84 has sides 86 flaring upwardly and outwardly to allow stacking of the cups within each other. Legs 88 extend downwardly beneath the cup 84 for support. A ledge 90 runs around the interior circumference of the cup 84 about halfway up the cup sides. Ledge 90 is positioned at a vertical depth to allow legs 88 of cup 84a to rest upon the ledge 90 of cup 84b within which cup 84a is nested. Sufficient room is left in the cavity between the exterior bottom of cup 84a and the interior bottom of cup 84b to allow storage of an individual serving of spaghetti 92, in cup 84b. Similarly, cup 84b is stacked in cup 84c on ledge 90 with a serving of spaghetti 92 between. The size of the spaghetti serving may vary but is preferably about ten ounces. The sides of each cup 84a-c are perforated with vertically extending slots 94 to allow water to penetrate to the stored individual serving of spaghetti 92. Cups 84a-c are each provided with an outwardly flanged lip 96 around the upper rim of the cup.

Figure 7:
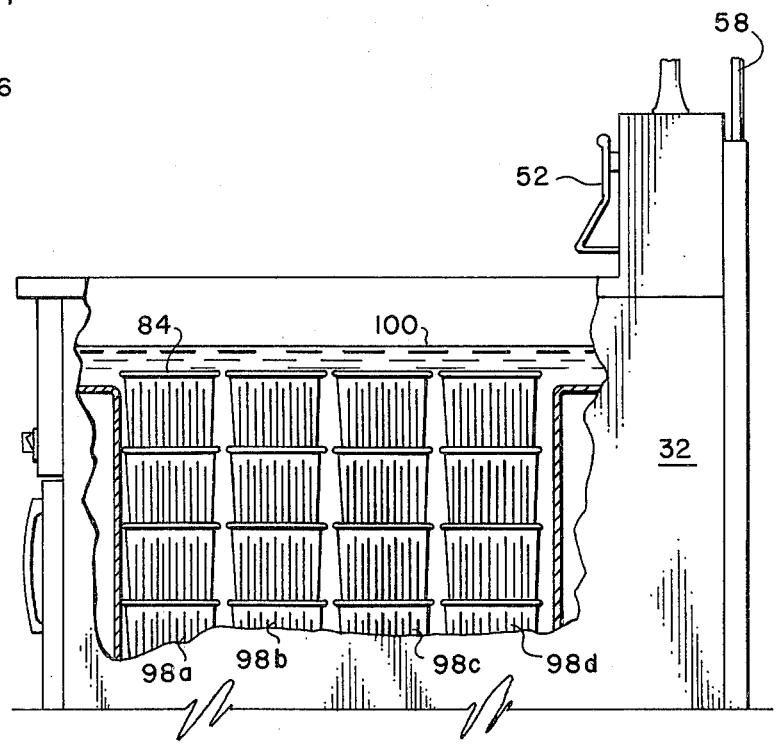
FIG. 7 is a partially cut-away side view of a portion of the cooking system of the present invention.

FIG. 7 shows a partially cut-away view of storage tank 32 disclosing the stacking of cups 84 during storage. The cups are nested in vertical columns 98a-d. Several rows of cups stacked in vertical columns may be placed in storage tank 32, each cup 84 containing an individual serving of spaghetti 92 immersed in cool water 100 for preservation. In a preferred embodiment, 40 light cups are stacked in columns four high, with three rows each having four columns.

Figure 8:
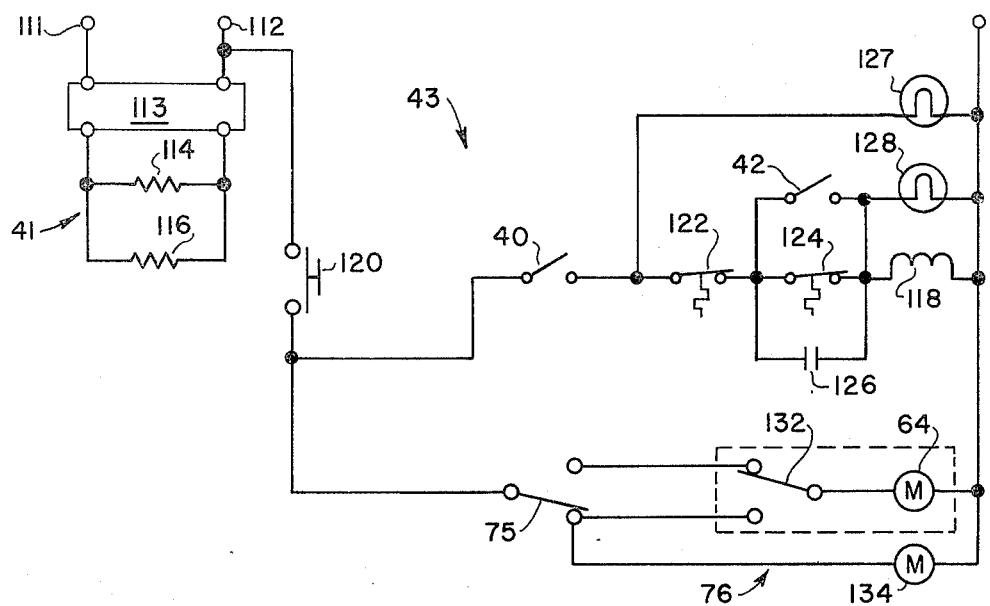
FIG. 8 is a schematic drawing of the heating and timing circuitry of the present invention.

FIG. 8 discloses the electrical circuitry used to automatically control the heating and cooking process. Electrical inputs 111 and 112 are connected by contactor 113 across heaters 41 comprising resistors 114 and 116 by contactor coil 118. A circuit breaker 120 is connected to input line 112 to prevent damage from overloading. The other side of circuit breaker 120 is connected to the input lines of heater circuitry 43 and timing circuitry 76.

With reference to heater circuitry 43, manually operated heater switch 40 is connected to circuit breaker 120. The output terminal of switch 40 is connected to a high-limit thermostat 122 which protects the electric heaters 41 in the event heater switch 40 is turned on accidently before cook pot 30 is filled with water. An operating thermostat 124 is connected in series with thermostat 122 to maintain the heated water in cook pot 30 at a simmering temperature just below boiling. It has been found that maintaining water at a temperature below the boiling point provides satisfactory reconstituting of the spaghetti while reducing the air conditioning load caused by excessive water vapor in the air during boiling. A capacitor 126 is connected in parallel across operating thermostat 124. Boil/simmer switch 42 is also connected in parallel across operating thermostat 124 in order to bypass thermostat 124 when boiling water is desired. An indicator light 127 is connected between heater switch 40 and neutral to show that the switch is on. Indicator light 128 is connected between boil/simmer switch 42 and neutral to light up when switch 42 is turned to the boil mode. Lights 126 and 128 are displayed inside switches 40 and 42 on front panel 18, as shown in FIG. 1.

A preferable embodiment employs 120/240 volts and 30 amps in a one phase system. The heater elements are each rated at 3700 watts. The gear motor is a torque motor with a 6 rpm output. With reference to timing circuitry 76, timer switch 75 having upper and lower positions is connected to circuit breaker 120 and is in direct contact with activator button 74 (FIG. 1). Switch 75 is normally in the lower position connected to timer motor 134 which is controlled by selector dial 72 shown in FIG. 1. A microswitch 132 having upper and lower positions is normally disposed in the upper position out of contact with timer switch 75. The other end of microswitch 132 is connected to gear motor 64 which operates bell crank arm 66. Timer motor 134 is connected between normally closed timer switch 75 and neutral.

In operation, heater switch 40 is closed, heating resistors 114 and 116 and activating indicator light 126. If the water in the cook pot 30 is to be boiled, boil/simmer switch 42 is turned to the boil mode, bypassing operating thermostat 124 and activating indicator light 128. Selector dial 72 is turned to the desired cooking time and activator button 74 is pushed throwing timer switch 75 to the upper position to establish contact with microswitch 132. Gear motor 64 is thereby activated causing rotation of bell crank arm 66 by 180°. This action results in vertical lift arm 58 lowering cooking basket 50 into the hot water of cook pot 30. After gear motor 64 has rotated bell crank arm 66 by 180°, a cam mechanism (not shown) on gear motor 64 causes microswitch 132 to flip to the lower position out of contact with switch 75, thus stopping gear motor 64.

At the end of the cooking period, the timer motor 134 has returned selector dial 72 to zero. Cam means (not shown) on timer motor 134 flips timer switch 75 to its lower position to again establish contact with microswitch 132. Gear motor 64 again rotates through 180° causing bell crank arm 66 to raise lift arm 58, thus automatically raising cooking basket 50 out of the hot water in cook pot 30. At the end of the 180° rotation of gear motor 64, microswitch 132 is cammed to its upper position out of contact with switch 75 and motor 64 is stopped. Thus, cooking basket 50 is automatically lowered and raised by timer switch 75, either by manually pushing button 74 at the beginning of the cooking period or automatically by timer motor 134 at the end of the cooking period.

Figures 9, 10, 11:
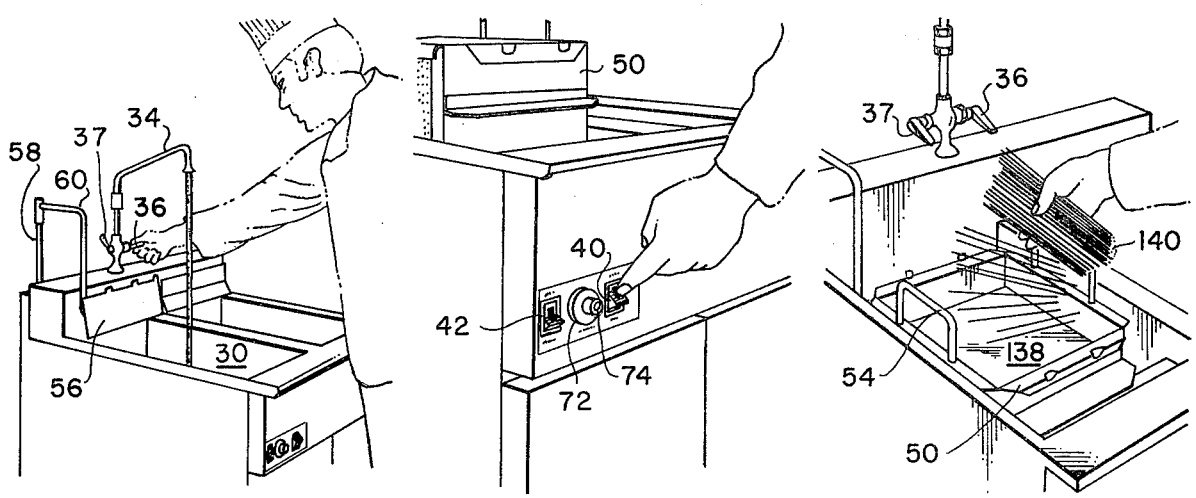
FIGS. 9 through 16 are graphic depictions of steps in the process of the present invention.

The operation of the spaghetti cooking system is shown in FIGS. 9–16. As shown in FIG. 9, cook pot 30 is filled with water from water faucet 34. Lifter plate 56 and vertical lift arm 58 are in the raised position. Heater switch 40 is then turned on as shown in FIG. 9 activating heaters 41. After about 20 to 30 minutes, the water in cook pot 30 will reach a boiling or near-boiling temperature depending upon the mode of boil/simmer switch 42. Selector dial 72 is then rotated to the desired cooking time depending upon the type of pasta used. For spaghetti, the cooking time is normally 10 to 15 minutes. Cooking basket 50 is attached to lifter plate 56, and activator button 74 is pushed to lower the cooking basket 50 into the hot water 138 of cook pot 30.

Referring to FIG. 11, dry spaghetti 140 is dropped into hot water 138 within cooking basket 40. The spaghetti strands are separated as they are dropped to reduce the possibility of sticking together. Preferably, a load of about six pounds of dry spaghetti will be cooked at one time in cooking basket 50.

Figures 12, 13, 14:
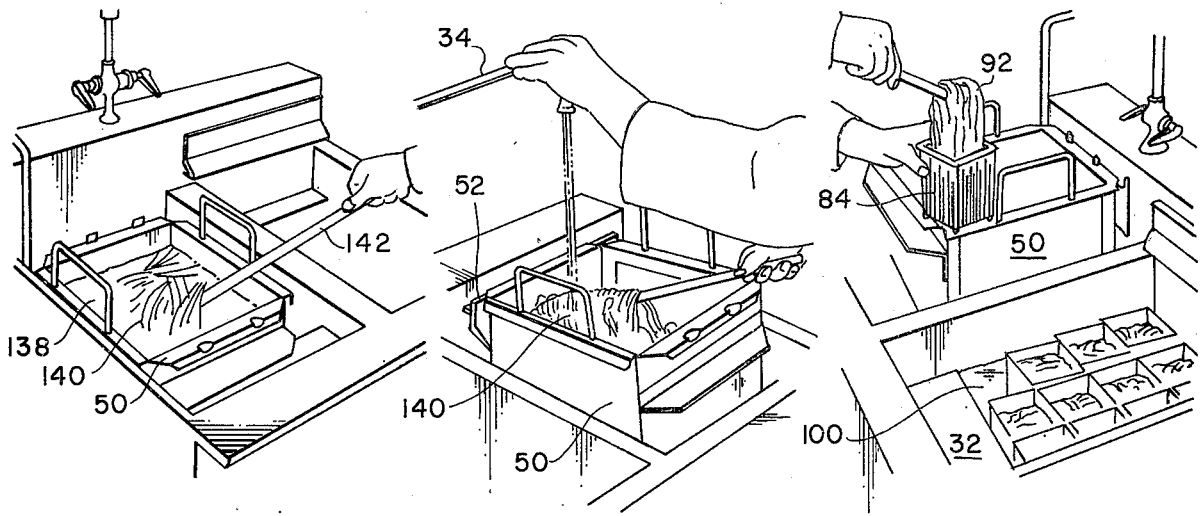

As shown in FIG. 12, the spaghetti 140 is stirred gently by an appropriate ladle 142 while being cooked to keep the spaghetti strands separated. At the end of the cooking cycle, gear motor 64 is activated and lifter plate 56 automatically raises cooking basket 50 out of hot water 138. When cooking is completed, the spaghetti should be thoroughly cooked but not mushy. As shown in FIG. 13, cooking basket 50 is hung on rigid suspension plate 52 in storage tank 32. The cooked spaghetti 140 is thoroughly rinsed with cold water from faucet 34 to remove excess starch and to stop the cooking action.

Referring to FIG. 14, individual servings of spaghetti 92 are portioned into plastic serving cups 84 and stacked in clean cool water 100 in storage tank 32. The cooked spaghetti may be stored in this manner until reconstituted. If the holding time required is longer than normal or if the storage tank 32 is needed for other purposes, the cooked spaghetti may be put under refrigeration either in bulk or in individual serving cups 84.

Figures 15, 16:
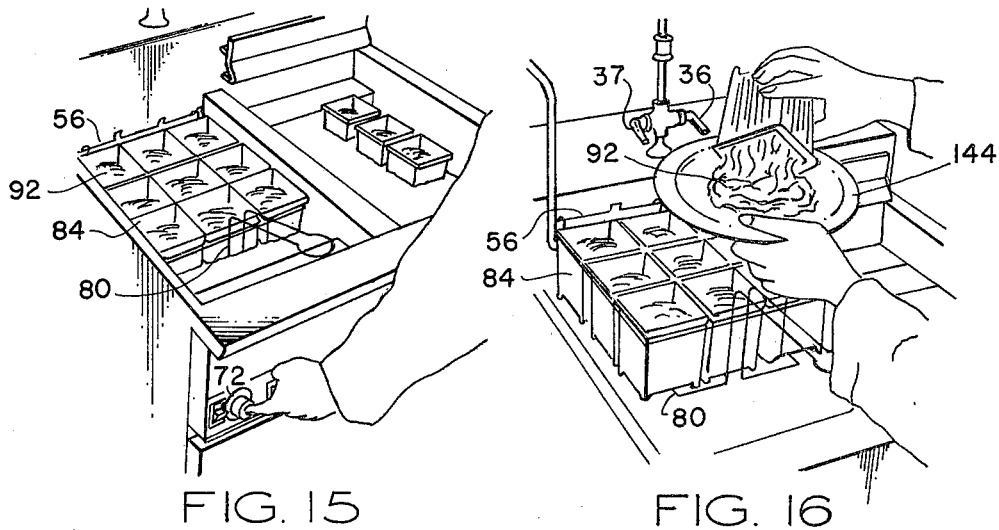

As shown in FIG. 15, the cooked spaghetti is normally reconstituted by placing the serving cups 84 in a cup rack 80. Cup rack 80 is attached to lifter plate 56, preferably having nine serving cups therein. The spaghetti servings 92 are heated by turning selector dial 72 to a short cook period, normally about 30 seconds. Boil/simmer switch 42 is turned to the simmer mode to maintain the water 138 below the boiling point. Activator button 74 is pushed, automatically lowering cup rack 80 into hot water 138. After the reheating cycle has been completed, lifter plate 56 will automatically raise cup rack 80 out of hot water 138. The individual servings of spaghetti are then emptied onto a serving plate 144, as shown in FIG. 16. Sauce and garnish are added and the spaghetti plate is ready to be served to the customer. Using the spaghetti cooking system of the present invention, as many as 500 individual servings can be reconstituted and served each hour.

It is understood from the foregoing description that the cooking system of the present invention has several important advantages over other systems. A compact and efficient system is provided for preparing, storing and reconstituting spaghetti. Thus, the system of the present invention makes spaghetti a practical alternative to other quick-serving foods. The low cost of preparing and serving spaghetti, relative to other presently prepared fast foods, makes the present system very attractive to proprietors of convenience restaurants. The automatic heating and timing circuitry minimizes the need for an operator to attend the machine, thereby increasing the efficiency of the overall restaurant operation.

Another advantage is the utilization of a separate storage basin for washing and storing cooked spaghetti. The cook pot is thus freed for repeated use in cooking fresh batches of spaghetti. The close proximity of the storage tank to the cook pot provides for a minimum of activity in cleaning and storing the spaghetti after the cooking cycle is finished. A further advantage is the use of nestable serving cups having just enough clearance between each cup when nested to contain an individual serving of spaghetti. These serving cups provide for very compact storing, simple reconstituting and rapid serving of the cooked spaghetti. Still another advantage is provided by the cup racks and variable cooking time selector which allows the cook pot to also be used in reconstituting the stored spaghetti for service. Yet another advantage is the boil/simmer switch which allows the cook pot water to be heated to boiling or thermostatically regulated below boiling.

Although a particular embodiment of the invention has been illustrated in the accompanying drawings and described in the foregoing detailed description, it will be understood that the invention is not limited to the embodiment disclosed, but is capable of rearrangement, modification and substitution without departing from the spirit of the invention.

What is claimed is:

1. Pasta cooking apparatus for cooking, storing and reconstituting pasta comprising:
   a housing having adjacent first and second basins, means for supplying water to said first and second basins and for heating the water in said first basin to cook said pasta;
   means for cooking said pasta in the heated water of said first basin for a predetermined period of time;
   means for storing said cooked pasta in cold water in said second basin, including means for containing said cooked pasta in individual servings in said second basin; and
   means for reconstituting said cooked pasta in said first basin in said individual servings.

2. The apparatus of claim 1 wherein said means for containing said cooked pasta comprises a plurality of containers, each container being proportioned to hold one of said individual servings and being perforated to admit water to said pasta and to drain water from said pasta.

3. The apparatus of claim 2 wherein said containers are nestable within each other, each container including means for supporting one of said containers within said each container above said individual serving.

4. The apparatus of claim 2 wherein said reconstituting means comprises rack means removably attached to said housing for suspending a plurality of said containers in said first basin to reconstitute said individual servings in said containers.

5. The apparatus of claim 4 and further comprising means for actuating said heating means to heat the water in said first basin for a second predetermined period of time to reconstitute said individual servings.

6. The apparatus of claim 5 wherein said means includes circuitry for maintaining said heating means at a temperature below boiling during said second predetermined period of time.

7. The apparatus of claim 1 wherein said cooking means comprises a portable basket for containing said pasta, said basket being perforated to admit water to said pasta and drain water from said pasta.

8. The apparatus of claim 7 and further comprising first support means on said housing for supporting said basket in the heated water of said first basin to cook said pasta and second support means on said housing for supporting said basket in the cold water of said second basin to cool said cooked pasta.

9. The apparatus of claim 8 wherein said cooking means further comprises timing means including means for lowering said first support means to position said basket in said heated water to begin said predetermined period of time, and means for raising said first support means to lift said basket out of the heated water at the end of said predetermined period of time.

10. In a cooking system for cooking, storing and reconstituting pasta, the combination comprising:
    a support housing;
    a storage tank mounted on said housing adapted for containing cool water at a predetermined level;
    means for supplying water to said storage tank;
    a plurality of pasta containers in said tank, each proportioned to contain an individual serving of pasta, said containers each being perforated to admit water to and drain water from said pasta, said containers being submerged in said water below said predetermined level to store said individual servings of pasta for reconstituting and serving;
    means for cooking said pasta, including a cooking tank mounted on said housing adjacent said storage tank, means for supplying water to said cooking tank and means for heating said water for a predetermined period of time to cook said pasta; and
    means for reconstituting said pasta stored in individual servings in said storage tank, including means for suspending a plurality of said pasta containers each holding said individual servings of pasta in said cooking tank for a second predetermined period of time.

11. The combination of claim 10 and further comprising means for controlling said heating means to maintain the water in said cooking tank below boiling temperature during said second predetermined period of time.

12. A cooking system for cooking and reconstituting pasta comprising:
    a cooking basin including means for supplying water to said basin;
    heating means in said cooking basin for heating the water in said basin;
    first control means for operating said heating means to maintain the water at a first temperature to cook said pasta;
    second control means for operating said heating means to maintain the water at a second temperature to reconstitute said pasta;
    switching means having a first position connecting said first control means to said heating means and a second position connecting said second control means to said heating means; and
    variable timed control means for immersing said pasta in the water in said cooking basin for a first predetermined period of time with said switching means in said first position to cook said pasta and for a second predetermined period of time with said switching means in said second position to reconstitute said pasta.

13. The cooking system of claim 12 wherein said first control means comprises a power source, electrical circuit means for manually connecting said power source to said heating means and first thermostat means for limiting the supply of power to said heating means to maintain said first temperature;

14. The cooking system of claim 13 wherein said second control means comprises second thermostat means for limiting the supply of power to said heating means to maintain said second temperature, and switch means for connecting said second thermostat means to said electrical circuit means.

15. The cooking system of claim 14 wherein said first thermostat means comprises means to maintain the temperature of said water at a predetermined level above the boiling point, and said second thermostat means comprises means to maintain the temperature of said water at a predetermined level below the boiling point.

16. The cooking system of claim 12 wherein said variable timed control means comprises a container for holding said pasta, actuable operating means for immersing said container with said pasta into the water for said first and second predetermined periods of time and for removing said container at the end of said first and second periods of time, and variable timing means associated with said operating means for actuating said operating means at the beginning and end of said first and second periods of time, including means for manually selecting said first and second periods of time.

17. Pasta cooking apparatus for cooking, storing and reconstituting pasta, comprising:
a free standing housing having adjacent first and second open water basins in a top portion of said housing;
means on said housing for supplying water to said first and second basins;
means in said first basin for heating the water in said first basin, including first thermostat means for operating said heating means to maintain the water in said first basin at a first predetermined temperature above the boiling point to cook said pasta, second thermostat means for operating said heating means to maintain the water in said first basin at a second predetermined temperature below the boiling point to reconstitute said pasta, and switch means to alternately connect said heating means to said first thermostat means or said second thermostat means;
means in said second basin for storing the cooked pasta from said first basin in individual serving portions immersed in cool water in said second basin;
control means for immersing the pasta in the water of said first basin including movable support means mounted on said housing and timed control means for lowering and raising said support means;
container means attachable to said support means for containing said pasta in said first basin to cook said pasta; and
basket means attachable to said support means for containing said stored pasta in said individual serving portions in the water of said first basin to reconstitute said pasta.

18. The cooking apparatus of claim 17 wherein said storing means comprises a plurality of containers, each being proportioned to hold one of said individual servings and being perforated to admit water to said pasta and to drain water from said pasta; and wherein said basket means comprises a rack for containing a plurality of said containers said rack being attachable to said support means for immersing said containers on said rack into said first basin to reconstitute said pasta.

19. The cooking apparatus of claim 18 wherein said timed control means comprises variable timer means for selecting a first period of time for cooking said pasta at said first temperature and for selecting a second period of time for reconstituting said pasta at said second temperature.

* * * * *